UNITED STATES PATENT OFFICE.

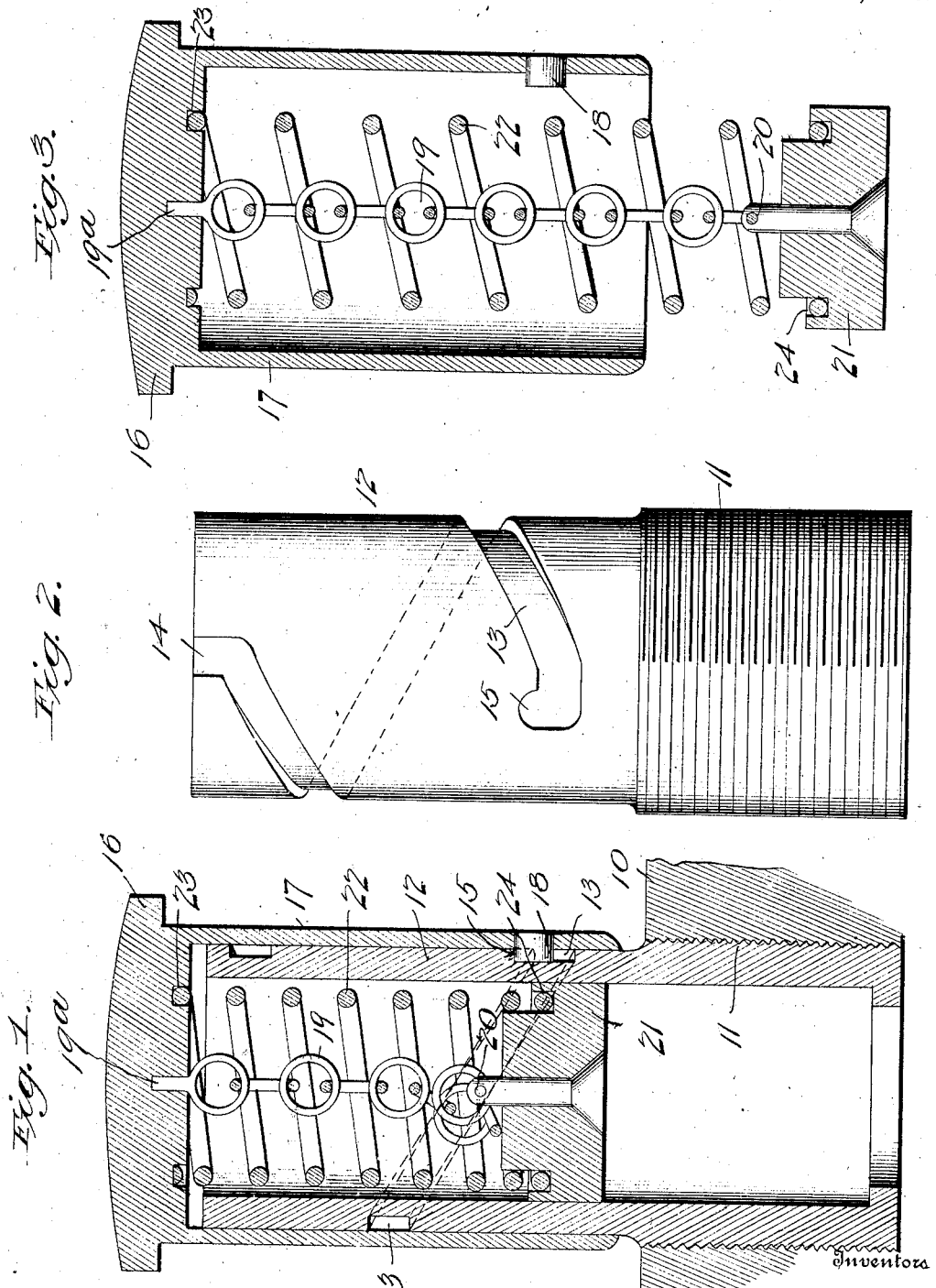

FREDERICK L. BROWN AND ISAAC WM. SPRINK, OF SCOTTDALE, PENNSYLVANIA.

GREASE-CUP.

No. 901,679.    Specification of Letters Patent.    Patented Oct. 20, 1908.

Application filed November 26, 1907. Serial No. 403,842.

*To all whom it may concern:*

Be it known that we, FREDERICK L. BROWN and ISAAC W. SPRINK, citizens of the United States, both residing at Scottdale, in the county of Westmoreland and State of Pennsylvania, have invented certain new and useful Improvements in Grease-Cups, of which the following is a specification.

This invention relates to certain new and useful improvements in grease cups of the automatic compression type wherein a spring actuated follower piston is employed to exert a constant pressure upon the lubricant to force it to the parts to be lubricated.
One of the most important objects of the invention is to produce a grease cup of the type mentioned above, for use in feeding heavy grease to locomotives or other large machinery, in which a novel form of guiding and locking mechanism is used to permit of the compression cap being easily moved to its locking position on the body of the cup, notwithstanding the strong pressure exerted against such movement by the spring pressed follower piston.

Other objects of the invention will be apparent from the following detailed description when taken in connection with the accompanying drawings.

The invention is susceptible of many modifications, but a preferred embodiment thereof is shown in the accompanying drawings, wherein—

Figure 1 is a vertical sectional view of the improved grease cup, showing the same in its operative position with the parts under compression. Fig. 2 is an elevation of the grease cup body, the compression cap being removed. Fig. 3 is a detail sectional view of the compression cap and its attached parts.

Like characters of reference designate corresponding parts.

Referring to said drawings, 10 designates an internally threaded socket portion of the machine element to which the lubricant is to be forced, and into which is screwed a similarly threaded coupling end 11 of a cylindrical grease cup body 12. The body of the grease cup, above its threaded portion is provided in its external surface with a spiral guiding groove or path 13 which extends from a point slightly above said threaded portion to a point adjacent to the upper edge of the said body portion, and terminates in a vertically arranged entrance 14 which extends through said upper edge. The lower end of the guiding groove or path terminates in an upstanding keeper notch 15.

The closure for the grease cup body 12 comprises a compression cap provided with an enlarged overhanging head 16 from which depends a sleeve 17 the lower end of which is provided with an inwardly projecting holding and guiding pin 18. Said sleeve is of a size to permit of its being telescoped over the body 12 with its inwardly projecting pin 18 resting within the spiral guiding groove or path. A retaining chain 19 has one end fastened to the head of said cap within the sleeve, as at 19$^a$, and its other end has a swiveled bolt connection 20 with a follower piston 21. A strong spiral compression spring 22 surrounds said retaining chain 19, one end thereof being seated within a groove 23 formed in the head of the cap, its other end being seated in a groove 24 formed in the follower piston 21.

In operation, the threaded portion of the cup body is screwed into the portion 10 of the machine element, and the predetermined amount of the heavy grease placed within the said body. The follower piston is then placed within the body on top of the grease, and the spring then compressed sufficiently to permit of the guiding and holding pin of the sleeve being placed through the entrance and into the spiral guiding groove or path. At this point, manual rotation of the cap will cause the holding pin to easily follow the path or groove until it reaches the bottom thereof, whereupon the pressure of the spring will cause said cap to move vertically and cause said pin to enter the upstanding keeper notch, and thereby retain the cap securely in its locked position.

From the foregoing description it will be apparent that by means of the spirally arranged guiding path or groove coöperating with the holding pin of the compression cap, a strong leverage is obtained which facilitates the forcing down of the cap against the exceedingly strong pressure exerted thereagainst by the follower piston spring and additional pressure incident to the compression of the heavy grease used. And, it will be further understood, that by means of the retaining chain connection between the head of the compression cap and the follower piston, said piston is at all times coupled to the cap and removable with it, and as the connection between the chain and the piston is a swiveled one, the chain is free to revolve when putting on or taking off the cap, thereby obviating any danger of the chain becoming "kinked". Also, the length of the chain is such as to permit a full stroke of the piston, while at the same time being sufficiently short to maintain the spring under pressure even when the piston has reached its limit of movement.

We claim:—

1. A grease cup comprising a body portion provided with an external spirally arranged guiding groove, a compression cap provided with a sleeve telescoping over the body and having a pin sliding in said groove and having a locking engagement therewith, and a spring-pressed follower piston.

2. A grease cup comprising a body portion provided with an external spirally arranged guiding groove, a compression cap provided with a sleeve telescoping over the body portion and adapted to engage with and be guided by said groove, and a follower piston having a flexible connection with said cap.

3. A grease cup comprising a body portion provided with an external spirally arranged guiding groove terminating in a keeper notch, a compression cap carrying a sleeve telescoping with the body portion and provided with a holding pin adapted to be inserted into said guiding groove and be guided thereby to said keeper notch, and a follower piston having a swiveled and flexible connection with said compression cap.

4. A grease cup comprising a body portion, a compression cap, and a follower piston having a swiveled and flexible connection with said compression cap.

5. A grease cup comprising a body portion, a compression cap, and a spring-pressed follower piston having a swiveled and flexible connection with said compression cap.

6. A grease cup comprising a body portion provided with a spirally arranged guiding groove terminating in an upstanding keeper notch, a compression cap carrying a sleeve one end of which is provided with an inwardly projecting pin adapted to enter said groove and be guided thereby to said keeper notch, a follower piston having a swiveled connection with said compression cap, and a spring interposed between said compression cap and said piston and surrounding said swiveled connection.

7. A grease cup comprising a body portion provided with a spirally arranged guiding groove terminating in an upstanding keeper notch, a compression cap carrying a sleeve one end of which is provided with an inwardly projecting pin adapted to enter said groove and be guided thereby to said keeper notch, a follower piston, a chain having one end swiveled to said follower piston and its other end connected to said compression cap, and a spiral spring interposed between said compression cap and said follower piston and surrounding said chain.

In testimony whereof we hereunto affix our signatures in the presence of two witnesses.

FREDERICK L. BROWN
ISAAC WM. SPRINK.

Witnesses:
E. F. DOORLEY,
KATHRYN PHELAN.